March 10, 1959 J. R. CHIPMAN 2,877,292

COLOR TELEVISION RECEIVER

Filed Dec. 14, 1954 2 Sheets-Sheet 1

INVENTOR.
Jack R. Chipman
BY Mason, Kolehmainen, Rathburn & Wyss
Att'ys

March 10, 1959 J. R. CHIPMAN 2,877,292

COLOR TELEVISION RECEIVER

Filed Dec. 14, 1954 2 Sheets-Sheet 2

INVENTOR.
Jack R. Chipman
BY
Mason, Kolehmainen, Rathburn & Wyss
Att'ys

United States Patent Office 2,877,292
Patented Mar. 10, 1959

2,877,292

COLOR TELEVISION RECEIVER

Jack R. Chipman, Tonawanda, N. Y., assignor to Sylvania Electric Products, Inc., a corporation of Massachusetts Application December 14, 1954, Serial No. 475,240

10 Claims. (Cl. 178—5.4)

The present invention relates to color television receivers, and, more particularly, to the color demodulator portion of a color television receiver wherein the color information contained in a received color television signal is demodulated and applied to a color picture tube so as to reproduce the transmitted image in color.

Under present day color television standards, the composite television signal which is transmitted to the receiver includes chrominance or color information which appears in the form of amplitude and phase modulation components of a color subcarrier, this chrominance information itself being modulated on the main picture carrier together with the luminance or brightness signal components of the transmitted color image. In the color television receiver the color subcarrier modulation components are demodulated by deriving color subcarrier reference signals of the correct phase relationship from the color burst synchronizing signal portion of the received color television signal. These reference signals are conventionally heterodyned with the color subcarrier modulation components in a pair of synchronous demodulator tubes so as to produce color difference signals which may be added to the luminance signal to produce the final color signals which are applied to the three electron guns of the color picture tube. The color demodulators of the receiver may either operate along the so-called I and Q axes of the color subcarrier or, in the alternative, the demodulators may operate along the B–Y and R–Y axes of the color subcarrier, in which case the outputs of the B–Y demodulator and the R–Y demodulator are matrixed to obtain the desired G–Y color difference signal. In the IQ system additional phase splitter tubes are required as well as the tubes required to add the color difference signals and the luminance signals together so that a substantial number of tubes is required in the receiver to perform the color demodulation process. In the so-called economy type receiver operating on the B–Y and R–Y axes, amplifiers are usually required between the demodulators and the picture tube although the actual adding process is performed in the picture tube by applying the luminance signal to the control grids of the three electron guns and applying the three color difference signals individually to the cathodes of these guns.

While some prior art arrangements have proposed the use of beam deflection tubes as color demodulators, these arrangements have not substantially reduced the compexity of the color demodulator portion of the receiver since in these arrangements individual tubes are still required for each demodulator, although such arrangements have the advantage of providing positive and negative signals which are required for the IQ system.

It is, therefore, a primary object of the present invention to provide a new and improved color demodulator arrangement for use in a color television receiver of the color subcarrier type.

It is another object of the present invention to provide a new and improved color demodulator arrangement for a color television receiver wherein all of the required color difference signals are derived from a single color demodulator tube.

It is still another object of the present invention to provide a new and improved color demodulator arrangement for a color television receiver wherein color difference signals corresponding to the B–Y, R–Y and G–Y axes are simultaneously derived from a single color demodulator tube.

A further object of the present invention resides in the provision of a new and improved color demodulator arrangement for a color television receiver wherein both the $E_I$ and $E_Q$ color difference signals are derived from a single color demodulator tube and in the correct polarities to matrix these color difference signals with the luminance signal so as to provide the desired color signals.

Briefly, in accordance with one aspect of the invention, the chrominance portion of the received color television signal is demodulated by providing a color demodulator tube having a stream of electrons of predetermined configuration, this electron stream being rotated at the color subcarrier frequency under the control of a suitable crystal controlled reference oscillator which is maintained in phase with the received television signal by means of the color burst synchronizing portion thereof. The electron stream is modulated in accordance with the chrominance information portion of the received color television signal and means are provided for sampling the rotating electron stream at fixed points corresponding to the phase angles of the desired color difference signals to derive demodulated color difference signals which vary in accordance with the intensity of the electron stream at said fixed points. If the television receiver is of the I and Q axis type the sampling process may be performed at points spaced 180° from each other and along the rotary path of the electron stream so that both positive and negative I and Q signals can ve obtained directly from the single color demodulator tube. On the other hand, if B–Y, R–Y and G–Y signals are desired, the sampling points are chosen so as to correspond to the B–Y, R–Y and G–Y axes required under present NTSC standards.

The invention, both as to its organization and method of operation, together with further objects and advantages thereof, will best be understood by reference to the following specification taken in connection with the accompanying drawings, in which.

Figure 1:
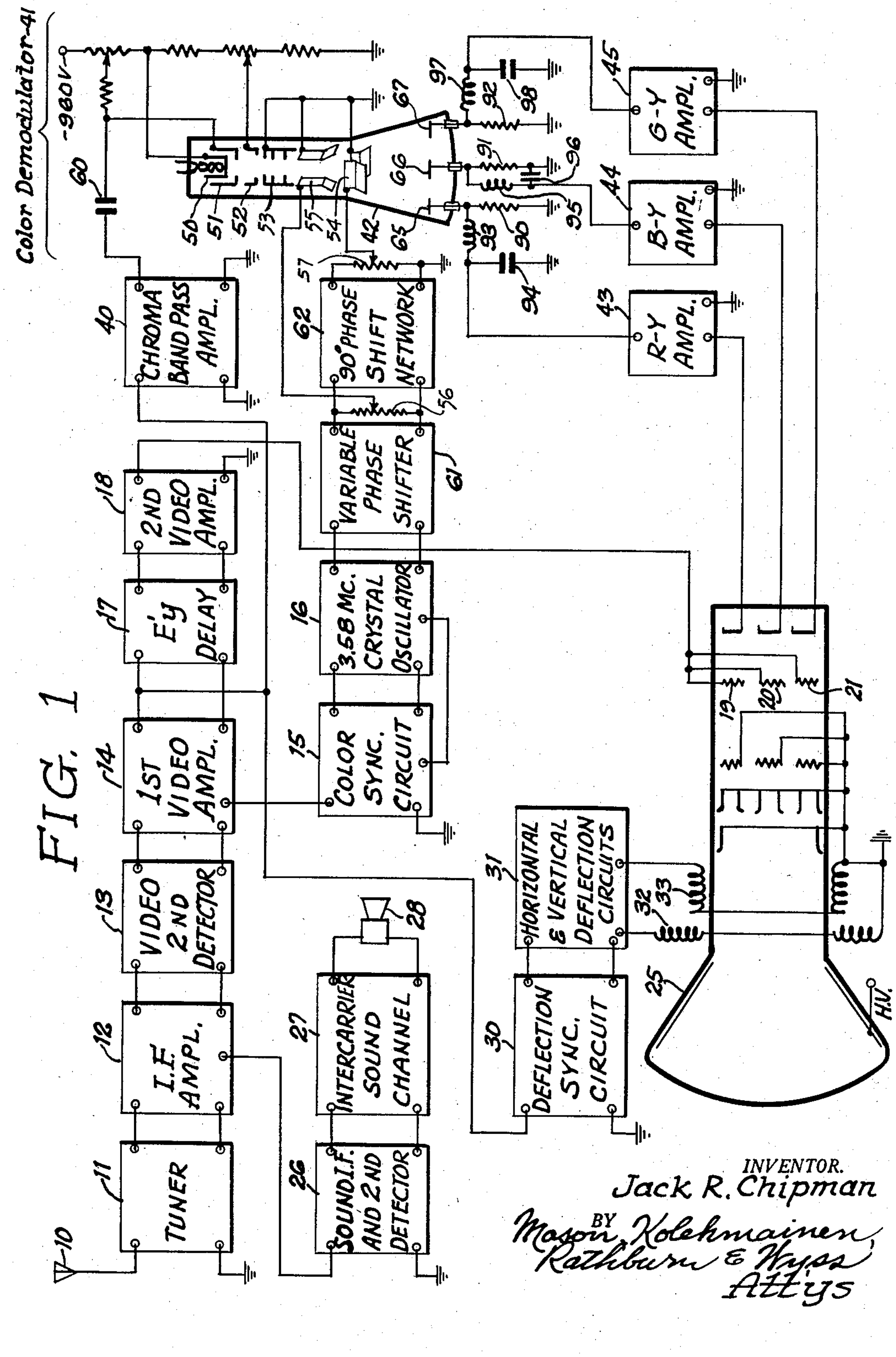
Fig. 1 is a schematic diagram, partly in block diagram form, of a color television receiver embodying the principles of the present invention.

Referring now to the drawings and more particularly to Fig. 1 thereof, the color television receiver of the present invention is therein illustrated as comprising an antenna system 10 which is adapted to receive color television signals and supply the same to a tuner 11 wherein the color television signals are converted into corresponding intermediate frequency signals, these intermediate frequency signals being amplified in an intermediate frequency amplifier 12. The output of the amplifier 12 is connected to the video second detector 13, the resultant video wave being amplified in a first video amplifier 14. The color burst synchronizing signal is derived from the first video amplifier 14 and is supplied to the color synchronizing circuit 15, the circuit 15 including a suitable color burst amplifier, phase detector and reactance tube for maintaining the 3.58 mc. crystal oscillator 16 in phase with the color burst reference signal so that the output of the oscillator 16 may be employed as a reference signal for color demodulation within the receiver.

The color television receiver shown in Fig. 1 is of the type in which the color difference signals are mixed with the luminance signal within the picture tube as distinguished from the type of receiver wherein separate adder circuits are employed ahead of the color picture tube to mix the color difference signals and luminance signals together. Thus, the output of the first video amplifier 14 is connected through a suitable delay circuit 17 and a second video amplifier 18 to the control grids 19, 20, and 21 of the red, blue and green electron beam producing guns of the color picture tube 25 so that the luminance signal is impressed upon the control grids 19, 20 and 21 in parallel.

In order to reproduce the sound signal which accompanies the received color television signal, a separate sound I. F. amplifier and second detector stage 26 is coupled to the last amplifier stage in the I. F. amplifier 12, a suitable intercarrier sound channel 27 being connected to the output of the second detector 26 so as to supply the desired sound signals to the loud speaker 28 of the color television receiver.

The output of the first video amplifier 14 is also employed as a source of deflection synchronizing signals for the deflection synchronizing circuit 30, the circuit 30 supplying suitable horizontal and vertical synchronizing signals to the horizontal and vertical deflection circuits 31 which provide the conventional horizontal and vertical scanning waves in the deflection coils 32 and 33 which surround the neck of the color picture tube 25.

In order to derive the desired chrominance information from the received color television signal, the video signal output of the first video amplifier 14 is amplified through a chroma band pass amplifier 40 which has a band pass of from 2 to 4 mc. so as to pass the upper and lower side bands of the color subcarrier while providing substantial attenuation for the other frequency components of the composite television signal. The output of the band pass amplifier 40 is coupled to a color demodulator circuit 41, which, in accordance with the present invention, includes a color demodulator tube 42 to be described in more detail hereinafter, the tube 42 providing suitable color difference signals for an R–Y amplifier 43, a B–Y amplifier 44 and a G–Y amplifier 45. The outputs of the amplifiers 43, 44 and 45 are connected respectively to the cathodes of the corresponding red, blue and green guns of the tricolor picture tube 25, it being recalled that the luminance or $E'_Y$ signal is applied in parallel to the control grids of these electron guns so that the desired red, blue and green signals are produced by addition of the luminance and color difference signals within the picture tube 25, as will be readily understood by those skilled in the art.

Considering now in more detail the portions of the receiver of Fig. 1 embodying the features of the present invention, the color demodulator tube 42 is of the cathode ray tube type and is provided with an indirectly heated cathode 50, control grid 51, a first anode 52 and a second anode 53 which are of suitable configuration to form an electron stream or beam which is deflected electrostatically by means of the horizontal electrostatic deflection plates 54 and the vertical electrostatic deflection plates 55. Preferably, the color demodulator tube 42 is of relatively small size and is so constructed that relatively small voltages applied to the deflecting plates 54 and 55 will produce the desired deflection of the electron beam. Furthermore, the tube 42 is preferably so constructed that relatively small energizing potentials are required for the elements of the tube, in the illustrated embodiments, a potential source of −960 volts being sufficient to provide a beam of suitable size and velocity.

In order to demodulate the color subcarrier signal developed in the output of the chroma band pass amplifier 40, this signal is coupled through the condenser 60 to the control grid 51 of the tube 42 and the electron beam of the tube 42 is rotated in a circular path at the color subcarrier frequency by means of ninety degree displaced voltages which are derived from the oscillator 16. More particularly, the 3.58 mc. output of the oscillator 16 is connected to a variable phase shifter 61 the output of which is connected through the potentiometer 56 to one of the deflection plates 55 and to a 90° phase shift network 62. The output of the network 62 is connected through the potentiometer 57 to one of the deflection plates 54 so that a rotating deflection field is produced by a combination of the right angle deflection voltages applied to the deflecting plates 54 and 55, as will be readily understood by those skilled in the art, the potentiometers 56 and 57 being adjusted so that the electron beam traverses a truly circular path on the end wall of the tube 42.

Figures 2, 3, 4, 5:
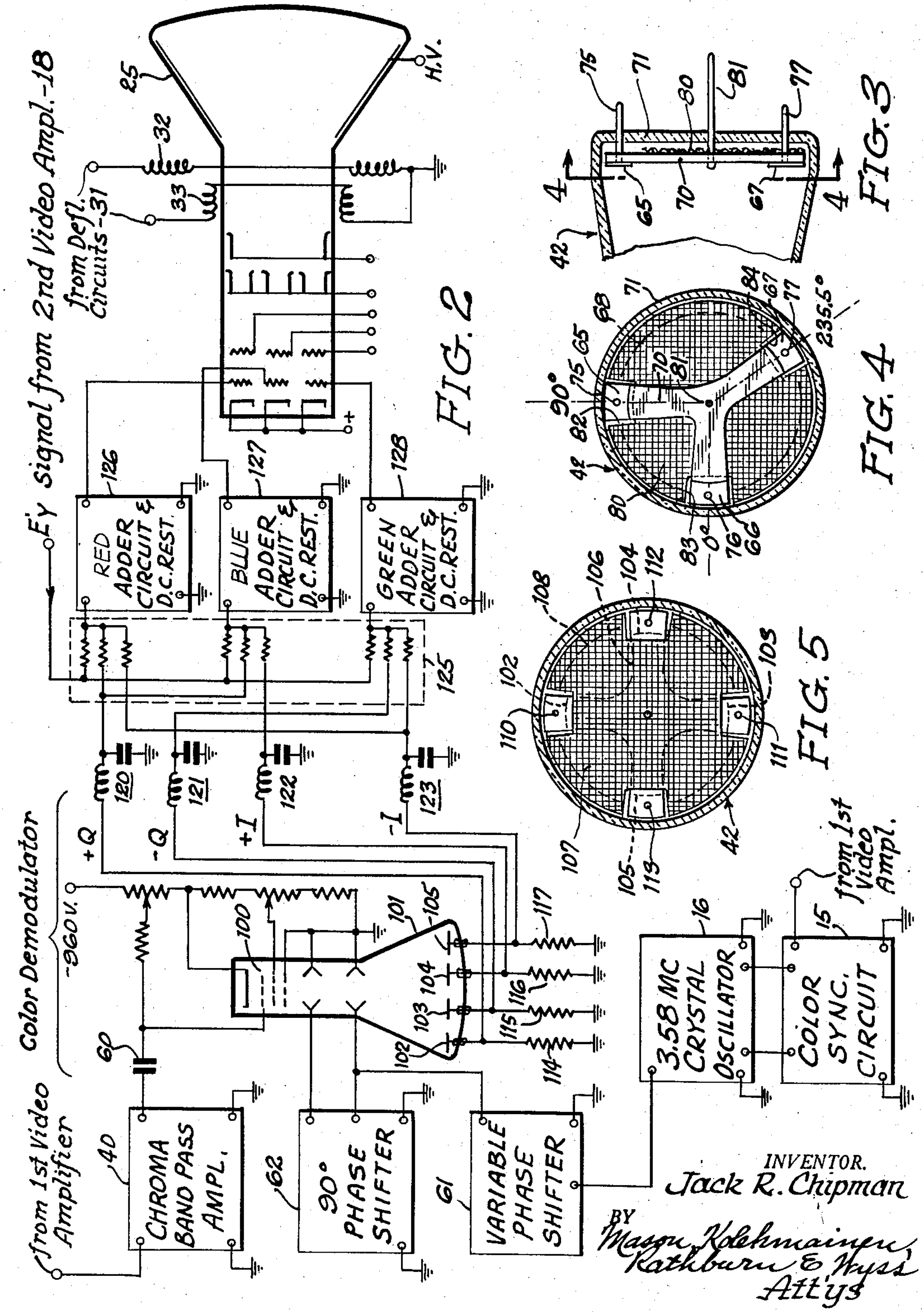
Fig. 2 is a schematic diagram of a portion of a color television receiver embodying an alternative arrangement of the present invention.
Fig. 3 is a fragmentary, sectional view of the forward end portion color demodulator tube employed in the receiver system shown in Fig. 1.
Fig. 4 is a sectional view taken along the lines 4—4 of Fig. 3.
Fig. 5 is a sectional front end view of the color demodulator tube employed in the system of Fig. 2.

Inside the tube 42 and adjacent the end wall thereof, there is positioned a plurality of sampling electrodes 65, 66 and 67 and the electrodes 65, 66 and 67 are so positioned that the electron beam formed by the electron gun 50, 51 and 52 strikes the electrodes 65, 66 and 67 in succession as the beam is deflected in the circular path illustrated in dotted lines at 68 in Fig. 4. As best illustrated in Figs. 3 and 4, the electrodes 65, 66 and 67 are supported on the arms of a supporting member 70 of insulating material which is positioned within the envelope 71 of the tube 42. In order to establish electrical connection to the sampling electrodes 65, 66 and 67, these electrodes are connected to terminal pins which extend through the end wall of the envelope 71 of the tube 42. More particularly, the electrode 65 is connected to a terminal pin 75 which is supported in the member 70 within the tube 42 and extends through the envelope 71, a suitable glass to metal seal being provided between the pin 75 and the envelope 71, as will be readily understood by those skilled in the art. In a similar manner, the electrode 66 is connected to a terminal pin 76 and the electrode 67 is connected to a terminal pin 77.

In order to collect the electron beam during periods when the beam does not strike one of the sampling electrodes 65, 66 or 67, there is provided a sheet of conductive wire gauze or mesh 80 which is positioned between the insulating support member 70 and the end wall of the envelope 71, an external electrical connection being made to the mesh 80 by means of the terminal pin 81 which extends through the end wall of the envelope 71. The terminal pin 81 is connected to the same potential as the second anode 53 so that a return path is provided for the electrons which strike the mesh 80. The mesh 80 is provided with notches 82, 83 and 84 in the periphery thereof so that clearance is provided between the sampling electrodes 65, 66 and 67 and the adjacent edges of the mesh member 80 and the electrical contact between the electrodes 65, 66 and 67 and the mesh 80 is prevented. Preferably, the mesh member 80 is coated with a suitable phosphor which will glow when struck by the electron beam so that as the electron beam is rotated in a circular path a corresponding circular trace of light is produced on the mesh member 80 which is visible through the end wall of the envelope 71. With this arrangement the deflection voltages which are applied to the deflection plates 54 and 55 may be adjusted in amplitude and relative phase so that a true circular beam path is provided which intercepts the sampling electrodes 65, 66 and 67 in substantially the mid-portions thereof, as shown by the circular path 68 in Fig. 4.

In order to derive the desired color difference signals from the sampling electrodes 65, 66 and 67, a suitable load circuit is connected to each of these electrodes through the terminal pins 75, 76 and 77. Thus, a load resistor 90 (Fig. 1) is connected to the electrode 65, a load resistor 91 is connected to the electrode 66 and a load resistor 92 is connected to the electrode 67. The signals developed across the load resistors 90, 91 and 92 are passed through separate low pass filters to remove the higher harmonic components of the sampled signal voltages. Thus, a low pass filter including the series inductance 93 and the shunt condenser 94 is employed to couple the signal developed across the load resistor 90 to the R–Y amplifier 43. In a similar manner, a low pass filter including the inductance 95 and the condenser 96 is employed to couple the signal developed across the resistor 91 to the B–Y amplifier 44 and a low pass filter including the inductance 97 and the condenser 98 is employed to couple the signal across the resistor 92 to the G–Y amplifier 45. The outputs of the amplifiers 43, 44 and 45 are coupled to the respective cathodes of the red, blue and green guns in the tricolor picture tube 25 and since the $E'_Y$ signal is applied to the control grids of these guns the desired color signals are developed in the output of each gun so that a color image is reproduced on the screen of the picture tube 25.

In considering the operation of the above described color demodulator tube 42 in demodulating the chrominance information and simultaneously providing three color difference signal outputs, it will be evident from the foregoing description that the electron beam of the tube 42 is rotated in a circular path at the color subcarrier frequency under the control of the 3.58 mc. oscillator 16, the variable phase shifter 61 and the 90° phase shift network 62. Accordingly, the electron beam makes one complete rotation along the path 68 for each cycle of the color subcarrier signal which is impressed upon the control grid 51 of the demodulator tube 42. As the beam strikes one of the sampling electrodes 65 a current flows through the corresponding load resistor, this current being proportional to the intensity of the beam and hence the amplitude of the color subcarrier signal at that particular instant. The sampling electrode 65, 66 and 67 are spaced from each other along the beam path 68 by predetermined angles which correspond to the relative phase angles between the R–Y, B–Y and G–Y modulation axes under which the standard NTSC color television signal is produced and transmitted to the receiver. Thus, the B–Y sampling electrode 66 is spaced 90° from the R–Y sampling electrode 65 and is also spaced 235.5° from the G–Y sampling electrode 67.

The variable phase shifter 61 may be adjusted so that the phase of the rotating electron beam of the tube 42 is correlated with the color subcarrier signal impressed upon the control grid of the tube 42 and when the electron beam strikes a particular one of the sampling electrodes 65, 66 or 67 the color subcarrier signal modulates the intensity of the beam in accordance with the corresponding color difference signal. Thus, the phase shifter 61 is adjusted so that as the electron beam strikes the B–Y sampling electrode 66 the intensity of the electron beam at that particular instant corresponds to the B–Y component of the color subcarrier signal which is impressed upon the control grid of the tube 42. When the beam has progressed to the R–Y electrode 65 the beam then has an intensity proportional to the R–Y component of the color subcarrier signal and when the beam has progressed to the G–Y electrode 67 the beam has an intensity proportion to the G–Y component of the color subcarrier signal.

As a result, the signals produced across the load resistors 90, 91 and 92 are proportional to the corresponding color difference signals and may be amplified to the desired level in the amplifiers 43, 44 and 45 before being impressed upon the cathodes of the three electron guns in the tricolor picture tube 25. Since current flows in the load resistors 90, 91 and 92 only during periods when the electron beam strikes the corresponding sampling electrodes 65, 66 and 67, a pulse type signal is produced across each load resistor, the amplitude of these pulses corresponding to the amplitude of the particular color difference signal. However, the low pass filters connected to each load resistor remove the higher harmonic components of these pulses so that only the desired color difference signal is obtained. It will be noted that by employing the single color demodulator tube 42, all of the matrices, synchronous demodulators and adder circuits required in conventional receivers are eliminated and the desired color difference signals are obtained directly from the sampling electrodes of the tube 42.

In Fig. 2 there is shown an alternative embodiment of the invention wherein color demodulation along the $E_I$ and $E_Q$ axes is provided. In the system of Fig. 2 only a portion of the receiver is shown and elements corresponding to those described above in connection with the system of Fig. 1 have been given the same reference numerals. Referring to Fig. 2, the color subcarrier signal which is amplified in the chroma band pass amplifier 40 is coupled through the condenser 60 to the control grid 100 of a color demodulator tube 101. The tube 101 is substantially identical to the color demodulator tube 42 described in detail above in connection with the system of Fig. 1 except for the fact that the tube 101 is provided with four sampling electrodes 102, 103, 104 and 105 which are spaced 90° apart and are positioned adjacent the end wall of the tube 101.

Thus, as more clearly shown in Fig. 5, a supporting member 106 of insulating material is provided adjacent the end wall of the tube 101 and the sampling electrodes 102, 103, 104 and 105 are positioned on the outer ends of the arms of the supporting member 106. A sheet of wire mesh 107 is positioned between the insulating support member 106 and the end wall of the tube 101 and the mesh 107 is coated with a suitable phosphor so that the circular path 108 of the electron beam is visible from the front end of the tube 101. Electrical connections are made through the end wall of the tube 101 to the sampling electrodes 102, 103, 104 and 105 by means of the terminal pins 110, 111, 112 and 113, respectively, and the load resistors 114, 115, 116 and 117 are connected to the terminal pins 110, 111, 112 and 113, respectively, to provide both positive and negative $E_I$ and $E_Q$ signals. Thus, across the load resistor 114 a plus $E_Q$ signal is developed, across the load resistor 115 a minus $E_Q$ signal is developed, across the load resistor 116 a plus $E_I$ signal is developed and across the load resistor 117 a minus $E_I$ signal is developed. These $E_I$ and $E_Q$ signals are coupled through the low pass filters 120, 121, 122 and 123 to a matrix 125 wherein the $E_I$ and $E_Q$ color difference signals are mixed with the $E'_Y$ signal from the video amplifier 18, these signals being added in the red adder circuit 126, the blue adder circuit 127 and the green adder circuit 128 so as to provide the desired red, blue and green signals for the three guns of the tricolor picture tube 25. The outputs of the adder circuits 126, 127 and 128 are coupled respectively to the control grids of the red, blue and green guns of the tube 25, the cathodes of these guns being connected to a suitable positive potential which may be varied for background control purposes.

In considering the operation of the I and Q demodulation system shown in Fig. 2, it will be understood that the electron beam of the tube 101 is deflected in a circular path under the control of the 3.58 mc. deflection voltages applied to the electrostatic deflection plates thereof, so that the electron beam follows the path shown in dotted lines at 108 in Fig. 6. As the sampling electrodes 102, 105, 103 and 104 are successively scanned by the electron beam in the order named, corresponding voltages are developed across the load resistors 114, 117, 115 and 116 which have an amplitude proportional to the amplitude of the color subcarrier signal at the I and Q modulation axes of the color subcarrier signal. The variable phase shifter 61 can be adjusted so that the phase of the electron beam is correlated with the position of the electrodes 102, 103, 104 and 105 and the beam strikes these electrodes at times corresponding to the I and Q modulation axes of the received color subcarrier signal. The positive and negative I and Q signals developed across the load resistors 114, 115, 116 and 117 are added together in the correct amounts in the matrix 125 to provide the desired color difference signals which are mixed with the luminance signal from the video amplifier 18 to provide the desired color signals for the tricolor picture tube of the receiver.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a color television receiver for receiving a color television signal of the type which includes a chrominance modulated color subcarrier signal and a color burst synchronizing signal of the same frequency as said color subcarrier, said color subcarrier being amplitude modulated at predetermined phase angles thereof in accordance with predetermined color difference signals, means for deriving the chrominance modulated color subcarrier signal from a received color television signal, means for separating the color burst synchronizing signal from said received color television signal, means controlled by said derived color burst signal for developing a reference signal of the same frequency as said color subcarrier, a color demodulator tube having a rotatable electron beam continuously rotatable over 360° and a plurality of targets arranged in a circle, means controlled by said reference signal for causing said beam to rotate over said targets, said targets being positioned in a circle at points corresponding to the phase angles of said color difference signals, and means for deriving a demodulated color difference signal from each of said targets.

2. In a color television receiver for receiving a color television signal of the type which includes a chrominance modulated color subcarrier signal and a color burst synchronizing signal of the same frequency as said color subcarrier, said color subcarrier being amplitude modulated at predetermined phase angles thereof in accordance with predetermined components of chrominance information, means for deriving the chrominance modulated color subcarrier signal from a received color television signal, means for separating the color burst synchronizing signal from said received color television signal, means controlled by said derived color burst signal for developing a reference signal of the same frequency as said color subcarrier, a color demodulator tube having a rotatable electron beam and a plurality of targets arranged in a circle lying in a plane traversing the beam, means controlled by said reference signal for causing said beam to rotate over and impinge upon said targets in predetermined sequence, said targets being positioned within said tube on a circle at points corresponding to the phase angles of said components of chrominance information, and means for deriving a demodulated chrominance information signal from each of said targets.

3. In a color television receiver for receiving a color television signal of the type which includes a chrominance modulated color subcarrier signal and a color burst synchronizing signal of the same frequency as said color subcarrier, said color subcarrier being amplitude modulated at predetermined phase angles thereof in accordance with two orthogonal chrominance signal components, means for deriving the chrominance modulated color subcarrier signal from a received color television signal, means for separating the color burst synchronizing signal from said received color television signal, means controlled by said derived color burst signal for developing a reference signal of the same frequency as said color subcarrier, a color demodulator tube having a rotatable electron beam and a plurality of targets arranged in a circle lying in a plane traversing said beam, means controlled by said reference signal for causing said beam to rotate continuously over and impinge upon said targets in predetermined sequence, said targets being positioned within said tube on a circle at points corresponding to the phase angles of said chrominance signal components, and means for deriving from said targets positive and negative demodulated color difference signals corresponding to said orthogonal chrominance signal components.

4. In a color television receiver for receiving a color television signal of the type which includes a color subcarrier which is modulated in accordance with chrominance information, the combination of, means for producing a stream of electrons of predetermined configuration, means for continuously rotating said electron stream in a circular path at the color subcarrier frequency of a received color television signal, means for modulating said electron stream in accordance with the chrominance information portion of said received color television signal, and means for sampling said electron stream at points in a circle spaced along said circular path at predetermined angles corresponding to the phase angles of desired color difference signals to derive signals proportional to the intensity of said electron stream at said spaced points.

5. In a color television receiver for receiving a color television signal of the type which includes a color subcarrier which is modulated in accordance with chrominance information, the combination of, means for producing a stream of electrons of predetermined configuration, means for continuously rotating said electron stream about a predetermined axis at the rate of one revolution for each color subcarrier cycle of a received color television signal, means for varying the intensity of said electron stream in accordance with the chrominance information portion of said received color television signal, and means including a plurality of targets arranged in a circle and spaced about said axis at angles corresponding to the relative phase angles of desired color difference signals for deriving color difference output signals proportional to the intensity of said electron stream in the vicinity of said targets.

6. In a color television receiver for receiving a color television signal of the type which includes a color subcarrier which is modulated in accordance with chrominance information, the combination of, a color demodulator tube having a continuously rotatable electron stream of predetermined configuration and a plurality of targets arranged in a circle, means for rotating said electron stream in such manner as to cause said stream to rotate over said targets in a continuous circular movement and at the rate of one complete rotation over said targets for each color subcarrier cycle of a received color television signal, said targets being arranged in a circle and spaced relative to one another so that said stream moves over said targets at periods corresponding to the phase angles of desired color difference signals, means for varying the intensity of said electron stream in accordance with the chrominance information portion of said received color television signal, and means connected to said targets for deriving color difference signals therefrom which are proportional to the intensity of said electron stream while scanning said targets.

7. In a color television receiver for receiving a color television signal of the type which includes a color subcarrier which is modulated in accordance with chrominance information, the combination of, a color demodulator tube having a rotatable electron stream of predetermined configuration and a plurality of targets arranged in a circle lying in a plane traversing said beam, means for rotating said electron stream in such manner as to cause said stream to move over and impinge upon said targets in predetermined sequence and at the rate of one complete rotation over said targets for each color subcarrier cycle of a received color television signal, said targets being spaced angularly relative to one another so that said stream impinges upon said targets at periods corresponding to the phase angles of desired color difference signals, means for varying the intensity of said electron stream in accordance with the chrominance information portion of said received color television signal, means connected to said targets for deriving color difference signals therefrom which are proportional to the intensity of said electron stream while impinging upon said targets, and means for adjusting the phase of rotation of said electron stream relative to said targets.

8. In a color television receiver for receiving a color television signal of the type which includes a chrominance modulated color subcarrier signal and a color burst synchronizing signal of the same frequency as said color subcarrier, said color subcarrier being amplitude modulated at predetermined phase angles thereof, the combination of means for deriving the chrominance modulated color subcarrier signal from a received color television signal, means for separating the color burst synchronizing signal from said received color television signal, means controlled by said derived color burst signal for developing a reference signal of the same frequency as said color subcarrier, a color demodulator tube having a rotatable electron stream of predetermined configuration and a plurality of targets said targets being arranged in a circle, means for continuously rotating said electron stream in such manner as to cause said stream to continuously and sequentially move over said targets, means responsive to said color burst synchronizing signal to cause said stream to move over said circularly arranged targets at the rate of one complete scan of said targets for each color subcarrier cycle of said received color television signal, means to which said chrominance modulated subcarrier signal is supplied for varying the intensity of said electron stream in accordance with said chrominance modulated subcarrier signal, and means connected to said targets for deriving chrominance signals therefrom which are proportional to the intensity of said electron stream while striking said targets.

9. The combination set forth in claim 8 wherein said targets, arranged in a circle, are three in number and spaced at different angles from each other.

10. The combination set forth in claim 8 wherein said targets, arranged in a circle are four in number and spaced at equal angles from each other.

References Cited in the file of this patent

UNITED STATES PATENTS

| | | |
|---|---|---|
| 2,492,926 | Valensi | Dec. 27, 1949 |
| 2,680,147 | Rhodes | June 1, 1954 |
| 2,718,553 | Adler | Sept. 20, 1955 |
| 2,743,310 | Schroeder | Apr. 24, 1956 |
| 2,779,818 | Adler | Jan. 29, 1957 |